US010841437B2

(12) United States Patent
Sakashita et al.

(10) Patent No.: US 10,841,437 B2
(45) Date of Patent: Nov. 17, 2020

(54) ELECTRONIC DEVICE FOR DETECTING A SUSPICIOUS OPERATION AND DISPLAYING THE FACE OF A USER PERFORMING THE SUSPICIOUS OPERATION

(71) Applicant: KYOCERA Document Solutions Inc., Osaka (JP)

(72) Inventors: Fumiya Sakashita, Osaka (JP); Yoichi Hiranuma, Osaka (JP); Shoichi Sakaguchi, Osaka (JP); Shohei Fujiwara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/275,985

(22) Filed: Feb. 14, 2019

(65) Prior Publication Data

US 2019/0268485 A1 Aug. 29, 2019

(30) Foreign Application Priority Data

Feb. 23, 2018 (JP) .................................. 2018-031298

(51) Int. Cl.
*H04N 1/00* (2006.01)
*G06K 9/00* (2006.01)

(52) U.S. Cl.
CPC ..... *H04N 1/00251* (2013.01); *G06K 9/00255* (2013.01); *H04N 1/00405* (2013.01); *H04N 1/00477* (2013.01); *H04N 1/00488* (2013.01); *H04N 1/00854* (2013.01); *H04N 1/00859* (2013.01); *H04N 2201/0094* (2013.01)

(58) Field of Classification Search
CPC ........... H04N 1/00251; H04N 1/00859; H04N 1/00854; H04N 1/00488; H04N 1/0048; H04N 1/00877
See application file for complete search history.

(56) References Cited

U.S. PATENT DOCUMENTS

| 2007/0024921 | A1* | 2/2007 | Ohta | ................... | H04N 1/00249 |
| | | | | | 358/448 |
| 2008/0226129 | A1* | 9/2008 | Kundu | ............. | G08B 13/19673 |
| | | | | | 382/103 |
| 2010/0165382 | A1* | 7/2010 | Asano | ................ | G06K 9/00228 |
| | | | | | 358/1.15 |

(Continued)

FOREIGN PATENT DOCUMENTS

JP 2003-244683 A 8/2003
JP 2014-055779 A 3/2014

*Primary Examiner* — Benjamin O Dulaney
(74) *Attorney, Agent, or Firm* — IP Business Solutions, LLC

(57) ABSTRACT

An electronic device includes a display, a first camera, a storage unit, and a control unit. The first camera images a face of a user who is operating the electronic device. The storage unit stores an image imaged by the first camera. The control unit includes a processor and, upon execution of a control program by the processor, functions as: a detection section detecting that a suspicious operation is being performed on the electronic device; and a controller allowing, when the detection section detects the suspicious operation, the display to display, as an image to be displayed in occurrence of the suspicious operation, the image that the first camera is imaging.

10 Claims, 7 Drawing Sheets

(56) References Cited

U.S. PATENT DOCUMENTS

| | | | |
|---|---|---|---|
| 2011/0078034 A1* | 3/2011 | Hayhow | G06Q 20/206 705/21 |
| 2012/0260307 A1* | 10/2012 | Sambamurthy | G06F 21/60 726/1 |
| 2012/0293642 A1* | 11/2012 | Berini | G06F 21/602 348/77 |
| 2015/0213691 A1* | 7/2015 | Dunn | G07F 17/34 463/20 |
| 2017/0041503 A1* | 2/2017 | Nobutani | G06K 9/00255 |
| 2018/0079234 A1* | 3/2018 | Teets | B65H 1/266 |
| 2019/0018939 A1* | 1/2019 | Lev | H04L 67/306 |

* cited by examiner

_US 10,841,437 B2_

ELECTRONIC DEVICE FOR DETECTING A SUSPICIOUS OPERATION AND DISPLAYING THE FACE OF A USER PERFORMING THE SUSPICIOUS OPERATION

INCORPORATION BY REFERENCE

This application claims priority to Japanese Patent Application No. 2018-031298 filed on 23 Feb. 2018, the entire contents of which are incorporated by reference herein.

BACKGROUND

The present disclosure relates to an electronic device, and more specifically to a technique of deterring a suspicious operation from being performed on an electronic device.

Electronic devices used in offices, for example image forming apparatuses, are shared by several users. If an illicit operation such as mischief is performed on such the shared image forming apparatus by one user, other users cannot use the image forming apparatus. Therefore, illicit operations must be deterred. To cope with the situation, techniques have been proposed for displaying images of surveillance cameras on an external PC (personal computer).

For example, there is a known system having the following configurations: a plurality of monitoring cameras installed in each monitoring area and a monitoring station that receives images photographed by the respective monitoring cameras are connected via a multi-network; an image creation processing device and a terminal device are provided in the monitoring station; the image creation processing apparatus cuts out an image from the images of the monitoring camera in a constant period, synthesizes the images having been cut out, and delivers the synthesized image in a stream format; and by receiving the synthesized image, the terminal device divides the image into images each corresponding to the respective monitoring area and displays them on corresponding positions on a map while updating.

As another technique, there is a known system having the following configurations: a guardian terminal device acquires from a route information providing server a route up to a destination from a starting place, the route being a safer route for a child who goes on an errand; between the guardian terminal device and a child mobile terminal device, a state where a communication line is connected and mutual communication is made possible is maintained at all times; images from a camera section of the child mobile terminal device are transmitted to the guardian terminal device so that they can be viewed; a current position that is periodically acquired by a GPS unit or the like is transmitted from the child mobile terminal device to the guardian terminal device: and the position is monitored at the guardian terminal device and when the child portable terminal device deviates from the safe route, the situation is notified to the guardian terminal device.

SUMMARY

A technique improved over the aforementioned techniques is proposed as one aspect of the present disclosure.

An electronic device according to one aspect of the present disclosure includes a display, a first camera, a storage unit, and a control unit. The first camera images a face of a user who is operating the electronic device. The storage unit stores an image imaged by the first camera. The control unit includes a processor and, upon execution of a control program by the processor, functions as: a detection section detecting that a suspicious operation is being performed on the electronic device; and a controller allowing, when the detection section detects the suspicious operation, the display to display, as an image to be displayed in occurrence of the suspicious operation, the image that the first camera is imaging.

DETAILED DESCRIPTION

Figure 1:
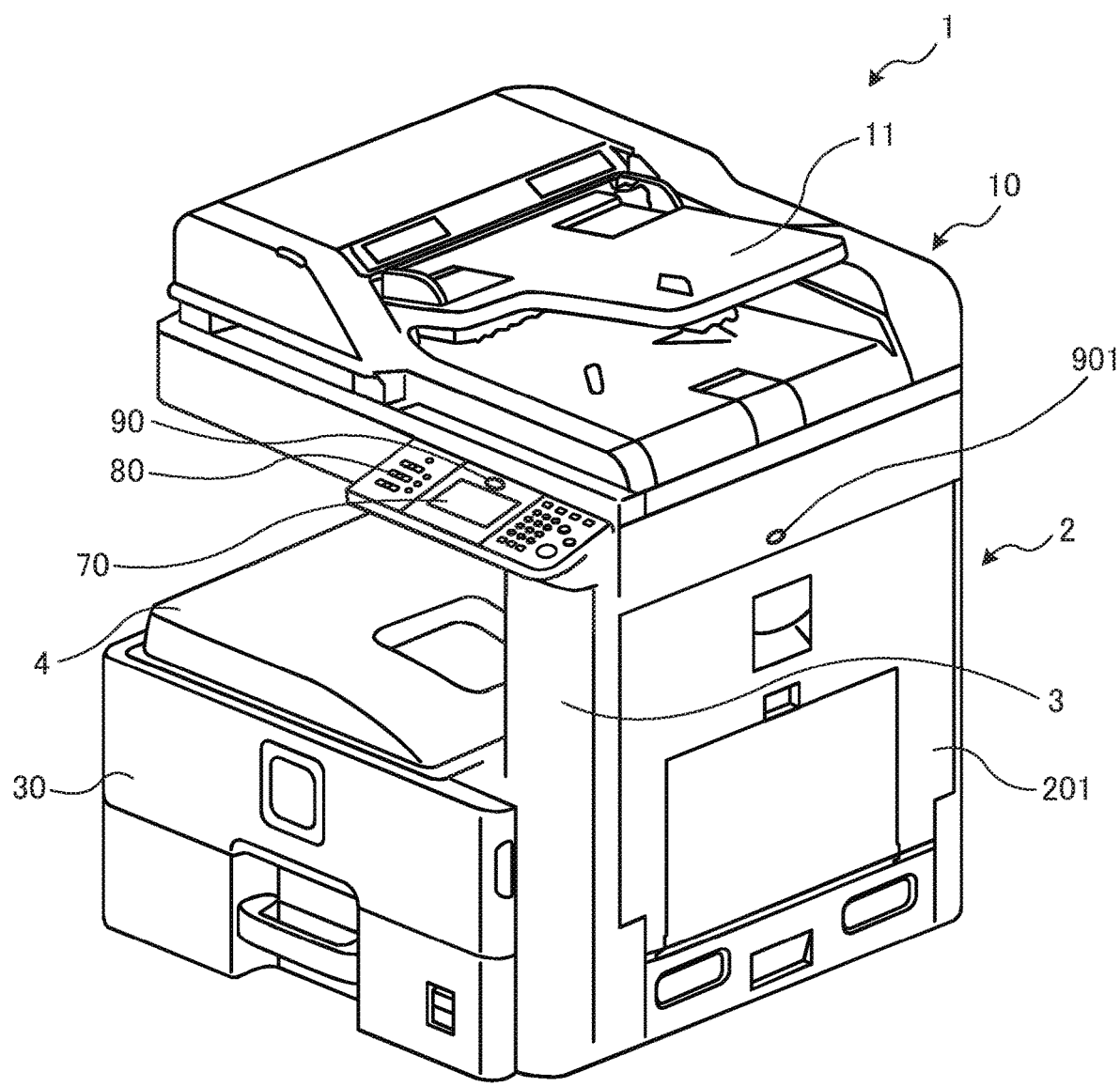
FIG. 1 is a perspective view illustrating the outer appearance of an image forming apparatus according to an electronic device of one embodiment of the present disclosure.
Figure 2:
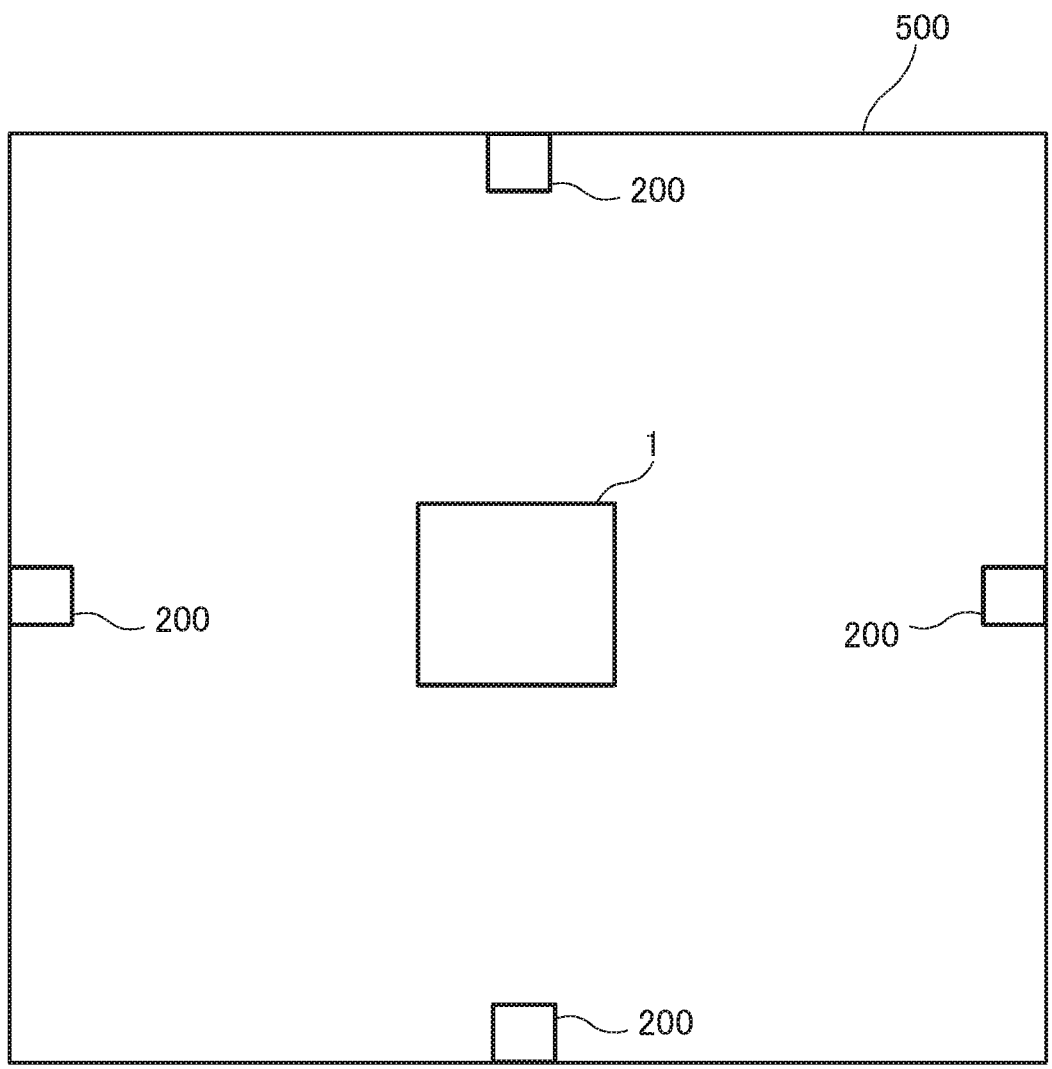
FIG. 2 is a diagram showing arrangement of second cameras at a periphery of the image forming apparatus.
Figure 3:
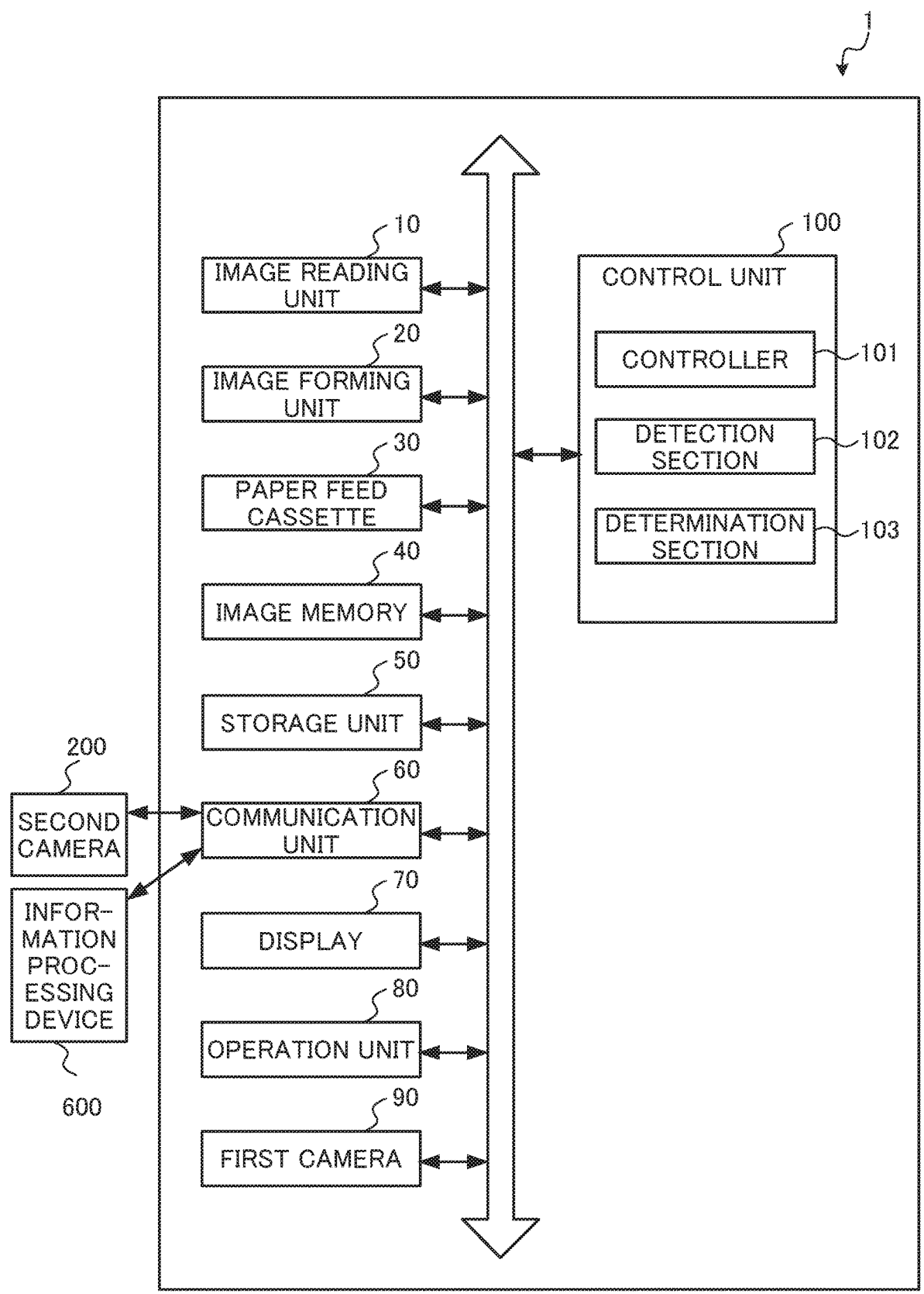
FIG. 3 is a block diagram showing an internal configuration of the image forming apparatus according to one embodiment of the present disclosure.

Hereinafter, a description will be given of an image forming apparatus 1 as an electronic device according to one embodiment of the present disclosure with reference to the drawings. FIG. 1 is a perspective view illustrating the outer appearance of the image forming apparatus 1 according to the electronic device of one embodiment of the present disclosure. FIG. 2 is a diagram showing arrangement of second cameras 200 at a periphery of the image forming apparatus 1. FIG. 3 is a block diagram showing an internal configuration of the image forming apparatus 1 according to one embodiment of the present disclosure.

The image forming apparatus 1 is a multifunction peripheral having a plurality of functions, such as facsimile transmission, copying, printing, and scanning. As illustrated in FIG. 1, the image forming apparatus 1 is roughly constituted of a main body 2, an image reading unit 10 arranged above the main body 2, and a connecting part 3 provided between the reading unit 10 and the main body 2.

The image reading unit 10 is an ADF (auto document feeder) having a document conveying unit 11 and having a scanner that optically reads a document conveyed by the document conveying unit 11 or a document placed on an un-illustrated contact glass. The image reading unit 10 obtains, by reading documents one by one, image data that is to be processed and be subjected to image formation.

The main body 2 includes an image forming unit 20, a paper feed cassette 30, an image memory 40, a storage unit 50, a communication unit 60, and so on.

The image memory 40 is a region for temporarily storing the image data read by the image reading unit 10.

The image forming unit 20 reads out the image data store in the image memory 40, and by using the image data, forms (prints) an image on a sheet fed from the paper feed cassette 30. The printed sheet is discharged to a discharge tray 4.

The storage unit 50 is a large-capacity storage device such as an HDD (hard disk drive). A video image imaged by a first camera 90 to be described later on is stored in one area of the storage unit 50.

The communication unit 60 is a communication interface including a communication module such as a LAN (local area network) chip. The image forming apparatus 1 is connected to each of the second cameras 200 via a network. Each of the second cameras 200 is installed, for example, inside a room 500 where the image forming apparatus 1 is installed, and images an image of a person present inside the room 500, especially, a user who is operating the image forming apparatus 1. Each of the second cameras 200 is installed inside the room 500, for example, in front of, behind, one side, and the other side of the image forming apparatus 1. The image forming apparatus 1 obtains via the communication unit 60 imaged images from each of the second cameras 200.

A display 70 and an operation unit 80 are arranged at the front side of the main body 2. The display 70 is constituted of, for example, a liquid crystal display (LCD) or an organic light-emitting diode (OLED). The display 70 displays, for example, an operation screen to be used for instructing an operation of the image reading unit 10.

The operation unit 80, for example, includes: a start key for instructing the execution of a print job; a determination key (enter key) for performing confirmation operation on a GUI (graphical user interface) that constitutes the operation screen; and numeric value input keys through which numeric values are inputted. The operation unit 80 receives operation on the screen displayed on the display 70 from the user.

The first camera 90 is an image pickup device used for imaging a face of the user who is operating the image forming apparatus 1 and images the user who is operating the image forming apparatus 1. The first camera 90 is, for example, composed of an imaging device made of an un-illustrated optical system and a CCD (charge coupled device) or CMOS (complementary MOS). The first camera 90 is juxtaposed in a vicinity of the display unit 70 in order to accurately image the face of the user who is operating the image forming apparatus 1.

The image forming apparatus 1 further includes a control unit 100. The control unit 100 is formed with a processor, a RAM (random access memory), a ROM (read only memory), and an exclusive hardware circuit. The processor is, for example, a CPU (central processing unit), an ASIC (application specific integrated circuit), or an MPU (micro processing unit).

The control unit 100 functions, upon execution of a control program such as an information processing program stored in the ROM or the storage unit 50 by the processor, as a controller 101, a detection section 102, and a determination section 103. The just mentioned sections of the control unit 100 may each be configured by a hardware circuit, instead of acting in accordance with the control program.

The controller 101 governs the overall operation control of the image forming apparatus 1. The controller 101 is connected to the image reading unit 10, the image forming unit 20, the paper feed cassette 30, the image memory 40, the storage unit 50, the communication unit 60, the display 70, the operation unit 80, the first camera 90, and so on. The controller 101 controls operation of each of the above mechanisms to which the controller 101 is connected and performs signal or data exchange with each mechanism.

Specifically, when the detection section 102 detects that a suspicious operation is being performed on the image forming apparatus 1, the controller 101 allows the display 70 to display the video image that the first camera 90 is imaging. That is, when someone performs a suspicious operation, which is an operation other than a predetermined proper operation, on the image forming apparatus 1, the figure of that person is shown in the display 70. This gives the person a psychological burden of being monitored and deters the suspicious operation.

Furthermore, when the detection section 102 detects that the suspicious operation is being performed on the image forming apparatus 1, the controller 101 extracts, from the video images stored in the storage unit 50, a video image imaged in a predetermined certain period before and after a time when the suspicious operation was performed (the certain period is, for example, a period between 10 seconds before the detection of the suspicious operation by the detection section 102 and 10 seconds after the detection), and allows the communication unit 60 to transmit the video image of the certain period to the information processing device 600 connected to the image forming apparatus 1 via the network. The information processing device 600 is for example a client terminal or a mobile terminal device owned by a predetermined administrator of the image forming apparatus 1. In this case, the controller 101 stores, in the storage unit 50, an e-mail address or an IP address of the information processing device 600, and transmits the extracted video image to the information processing device 600 by an e-mail function or by a data transmission function of the communication unit 60.

This omits the necessity of transmitting the video images of the total time taken by the first camera 90 to the administrator, and only the video image with great importance, that is, the video image imaged before and after the timing when the suspicious operation was performed on the image forming apparatus 1 is transmitted to the information processing device 600. Therefore, the amount of data transmitted from the image forming apparatus 1 to the information processing device 600 upon occurrence of the suspicious operation can be reduced.

In addition, a security video image showing a state where the administrator is coming toward the image forming apparatus 1 is stored in the storage unit 50 in advance. Upon detection by the detection section 102 of the suspicious operation, the controller 101 may allow the display 70 to display the security video image together with the video image that the first camera 90 is imaging, or in place of the video image. The display of the security video image on the display 70 gives a further psychological burden on the person, creating a situation where the suspicious operation is difficult to perform. The controller 101 may be configured to allow the display 70 to display, in place of the security video image, or together with the security video image, the following message: "A security guard is coming. Please feel free to ask about any unclear points".

The detection section 102 detects that the suspicious operation has been performed on the image forming apparatus 1. For example, the detection section 102 has a function of detecting an error occurring to the image forming apparatus 1; in detecting that a predetermined operation necessary for eliminating the error is performed under a state where no error is being detected, the detection section 102 detects that the suspicious operation is performed on the image forming apparatus 1.

The detection section 102 detects the error based on, for example, signals transmitted from a paper conveyance sensor, a remaining toner amount sensor, and a remaining paper amount sensor that are provided in the image forming apparatus 1.

The paper conveyance sensor is a sensor for detecting a conveyance status of paper and is made of a transmission type optical sensor and so on. The paper conveyance sensor is arranged in a plurality along a paper conveyance path. When a signal indicating absence of paper is transmitted from the paper conveyance sensor when paper presence should be detected (when not receiving a signal indicating presence of paper), the detection section 102 detects that an error related to a paper jam has been occurred. Further, since a plurality of the paper conveyance sensors are provided along the paper conveyance path, the detection section 102 can specify the location of the paper jam by determining from which of the paper conveyance sensors the signal indicating the absence of the paper is transmitted.

The detection section 102 stores, as an operation for eliminating the error related to the paper jam, an operation of opening a side cover 201. The side cover 201 is provided at the main body 2 and exposes the interior of the apparatus. The main body 2 has an opening/closing detection switch that detects opening and closing of the side cover 201. When a signal indicating the opening of the side cover 201 is transmitted from the opening/closing detection switch, the detection section 102 detects that a predetermined operation necessary for eliminating the error related to the paper jam is being performed.

The remaining toner amount sensor is a sensor that detects the amount of the toner remaining inside a toner container. On the basis of output of the remaining toner amount sensor, the detection section 102 detects that an out-of-toner error has been occurred.

The detection section 102 stores, as an operation for eliminating the out-of-toner error, the operation of opening the side cover 201 and an operation of removing the toner container from the inside of the main body 2. An installation and removal detection switch is provided at a toner container placement position in the main body 2. When a signal indicating that the toner container has been removed is transmitted from the installation and removal detection switch, and when the signal indicating the opening of the side cover is transmitted from the opening/closing detection switch, the detection section 102 detects that a predetermined operation necessary for eliminating the out-of-toner error is being performed.

The remaining paper amount sensor is a sensor that detects the presence or the absence of paper in the paper feed cassette 30 and is, for example, a reflection type optical sensor that irradiates light toward a paper from a hole formed on a paper mounting board. The output of the remaining paper amount sensor changes depending on whether the paper is remaining and not remaining in the paper feed cassette. On the basis of the output of the remaining paper amount sensor, the detection section 102 detects that an error related to an out-of-paper has been occurred.

The detection section 102 stores, as an operation for eliminating the error related to the out-of-paper, an operation of opening the paper feed cassette 30. Provided at a paper feed cassette placement position in the main body 2 is a drawing out detection switch that detects whether the paper feed cassette 30 is contained in the main body 2 or drawn out from the main body 2. When a signal indicating that the paper feed cassette 30 has been drawn out is transmitted from the drawing out detection switch, the detection section 102 detects that a predetermined operation necessary for eliminating the error related to the out-of-paper is being performed.

Based on video images, on which the figure of the user who is operating the image forming apparatus 1 is imaged and each of which has been obtained by the controller 101 from the first camera 90 and the second cameras 200 via the communication unit 60, the determination section 103 detects by a known technique the face of the user shown in each of the obtained images and to determine a detection level indicating accuracy of face detection. For example, (i) in the case of satisfying all conditions necessary to determine that a certain image portion of the video image is a face of a person, the determination section 103 detects that the image portion represents the face and also determines that the determination level is high; (ii) in the case of satisfying 85% of the conditions, the determination section 103 detects that the image portion is the face and also determines that the determination level is medium; (iii) in the case of satisfying 75% of the conditions, the determination section 103 detects that the image portion is the face and also determines that the determination level is low; and (iv) in the case of satisfying less than 75% of the conditions, the determination section 103 detects that the image portion is not the face. Accordingly, if a part of the face is hidden when, for example, an operator of the image forming apparatus 1 wears a mask or a hat, the determination section 103 determines that the detection level of the face of the user is low.

Specifically, for example, the controller 101 obtains via the communication unit 60 the video images each of which has been obtained by the first camera 90 and the second cameras 200. On the basis of each of the video images, the determination section 103 performs the face detection and the detection level determination. Among the video images obtained from the first camera 90 and the second cameras 200, the controller 101 allows the display 70 to display, as the video image to be displayed in occurrence of the suspicious operation, a video image that includes the face detected by the determination section 103 and whose determined detection level is the highest. With this configuration, out of the faces of the user imaged by the plurality of cameras, the controller 101 allows the display 70 to display the video image on which the face is most clearly shown.

When all of the detection levels determined by the determination section 103 are a predetermined threshold value (here, medium detection level) or lower, the controller 101 may change the display of the display 70 to a predetermined display mode that differs from a regular state. For example, the controller 101 allows the display screen of the display 70 to blink. The unusual display mode (e.g., blinking) of the display 70 draws the user's attention and the user moves his/her face to the display 70. Accordingly, the face of the user can be imaged clearly by the first camera 90 installed in the vicinity of the display unit 70.

Figure 4:
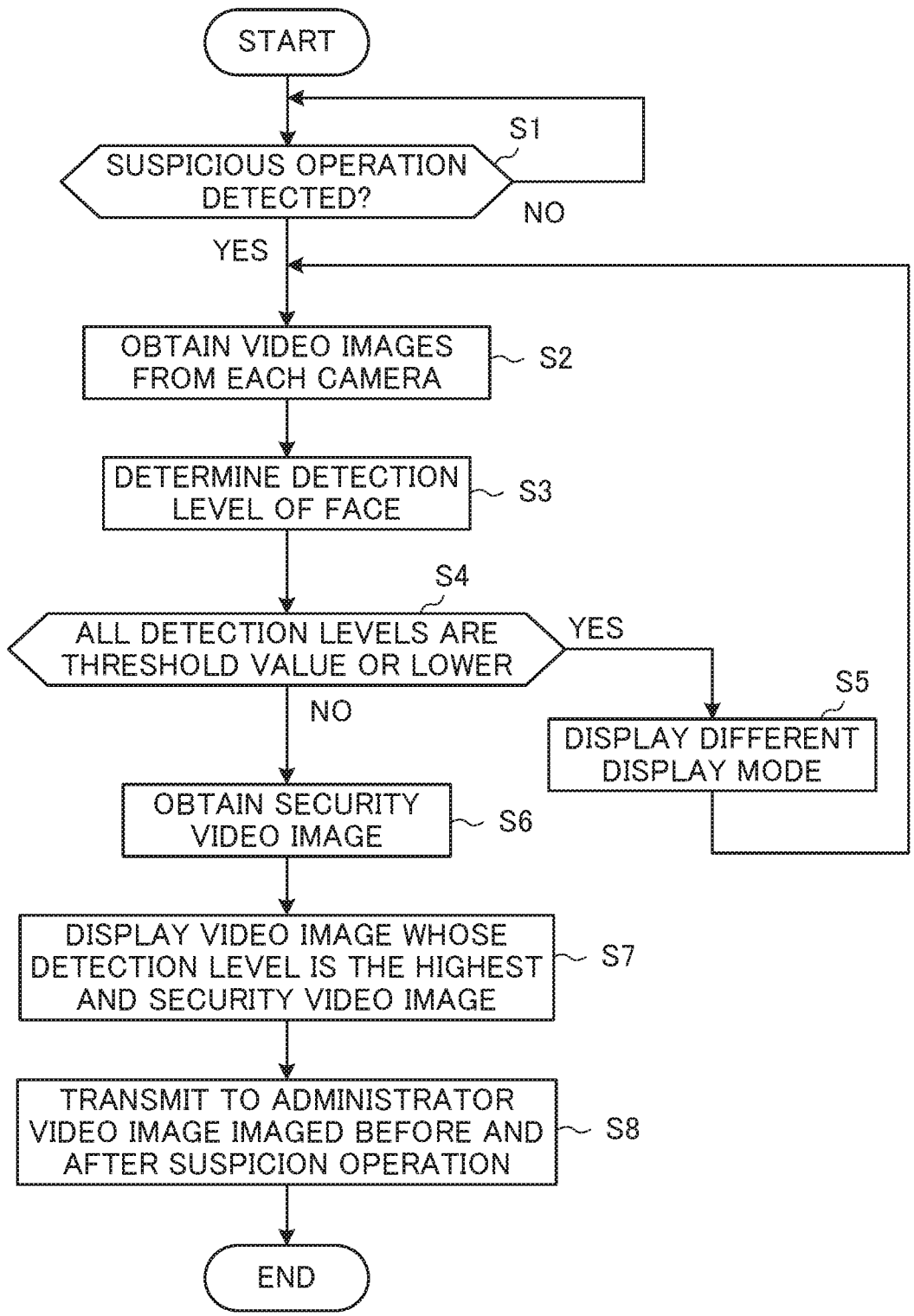
FIG. 4 is a flowchart showing a first embodiment of warning processing performed by the image forming apparatus.

Nest, warning processing performed by the image forming apparatus 1 will be detailed. FIG. 4 is a flowchart showing the first embodiment of the warning processing performed by the image forming apparatus 1.

Upon detecting a suspicious operation in the image forming apparatus 1 by the detection section 102 (YES in step S1), the controller 101 obtains from the first camera 90 and the second cameras 200 the video images on which the figure of the user who is operating the image forming apparatus 1 is imaged (step S2), and the determination section 103 detects the face of the user shown in each video image and determines the detection level of each face detection (step S3). When all the detection levels are the predetermined threshold value (medium detection level in the present embodiment) or lower (YES in step S4), the controller 101 changes the display screen of the display 70 to the display mode different from the regular state by blinking the display screen (step S5). The processing then returns to step S2. Here, the display 70 may be configured to include a speaker installed near the installation position of the first camera 90, and the controller 101 may be configured to sound a warning tone from the speaker in step S5.

Figure 5:
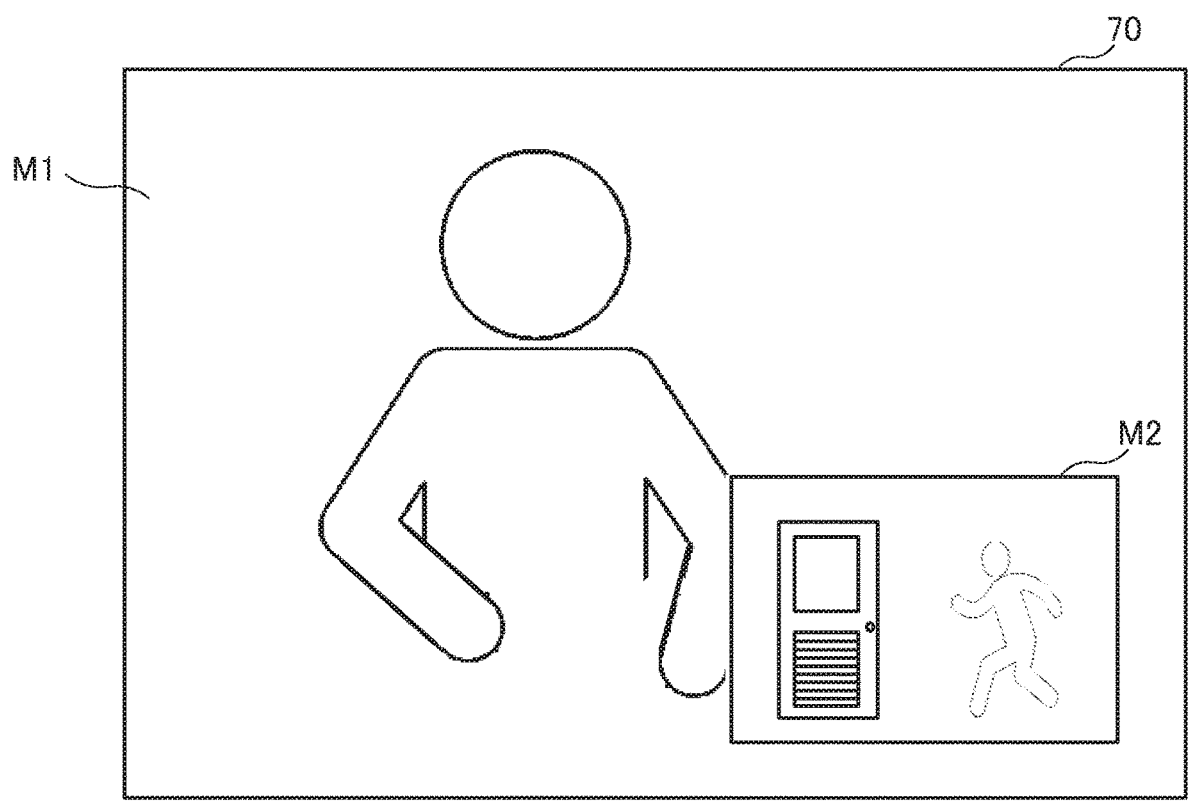
FIG. 5 is a diagram showing an example of a display screen of a display.

When the detection level of the face in the video image imaged by any of the cameras exceeds the predetermined threshold value (NO in step S4), in other words, when the detection level is high in the present embodiment, the controller 101 obtains from the storage unit 50 the security video image (step S6), and allows the display 70 to display the obtained security video image M2 together with a video image M1 whose detection level of the face is the highest (step S7) (if there is only one video image whose detection level exceeds the predetermined threshold value, together with the video image that exceeds the predetermined threshold value, as one example is illustrated in FIG. 5). Furthermore, the controller 101 extracts from the video images stored in the storage unit 50 the video image imaged in a certain period before and after a time when the suspicious operation was performed and transmits the extracted video image to the information processing device 600 determined in advance, such as the information processing device 600 owned by the administrator (step S8).

By applying a general technique, images of the user who operates the image forming apparatus can be displayed on a monitoring center or the like, but the effect of deterring suspicious operations on the image forming apparatus is insufficient in the general technique.

In contrast, the present embodiment is capable of more effectively deterring the suspicious operation on the image forming apparatus 1 as described thus far.

The above embodiment can be modified in various ways. For example, in the above embodiment, the controller 101 is configured to allow the display 70 to display, upon detection of the suspicious operation by the determination section 102, the video image whose face detection level exceeds the predetermined threshold value among the video images obtained from the first camera 90 and the second cameras 200. However, the determination section 103 may be configured not to perform the face detection and the detection level determination, and in step S7, the controller 101 may allow the display 70 to divide the display screen to display all of the video images obtained from the first camera 90 and the second cameras 200.

Furthermore, the image forming apparatus 1 may be configured such that not being provided with the second cameras 200 but with only the first camera 90. In that case, the controller 101 obtains the video images from the first camera 90 in step S2, and allows the display 70 to display only the video image obtained from the first camera 90 in step S7.

In step S7, the controller 101 is configured to allow the display 70 to display the video image whose face detection level exceeds the predetermined threshold value among the video images obtained from the first camera 90 and the second cameras 200 together with the security video image. Alternatively, the controller 101 may be configured to allow the display 70 to display only the video image whose face detection level exceeds the predetermined threshold value among the video images obtained from the first camera 90 and the second cameras 200. In this case, the processing of step S6 is not performed.

Still further, in step S7, the controller 101 may be configured to allow the display 70 not to display the video image obtained from the first camera 90 and the second cameras 200, but to display only the security video image. In this case, the processing of step S2 to step S5 is not performed.

Figure 6:
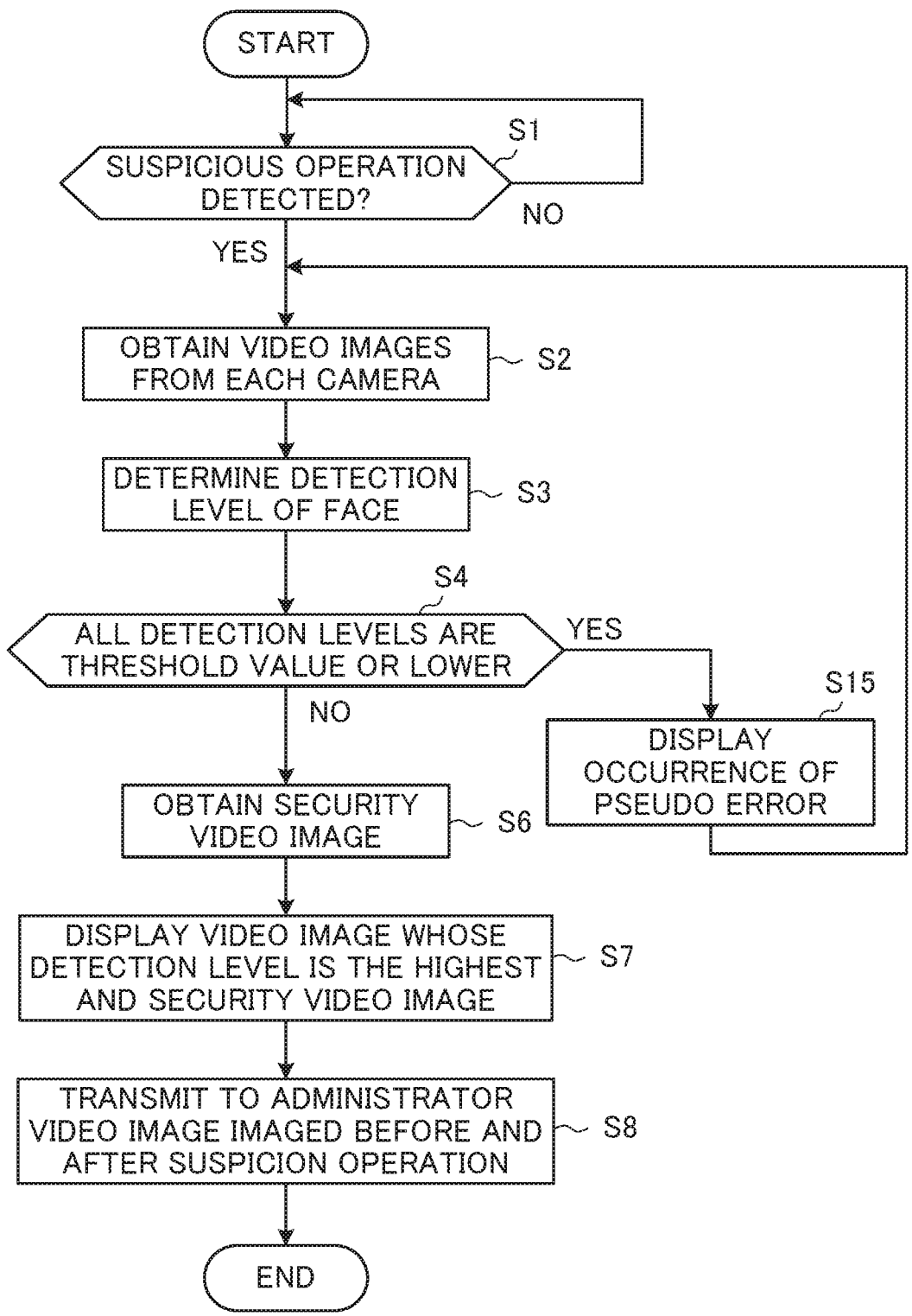
FIG. 6 is a flowchart showing a second embodiment of the warning processing performed by the image forming apparatus.

The warning processing performed by the image forming apparatus 1 will be detailed next. FIG. 6 is a flowchart showing a second embodiment of warning processing performed by the image forming apparatus. Explanation of processing similar to that of the first embodiment is omitted.

Figure 7:
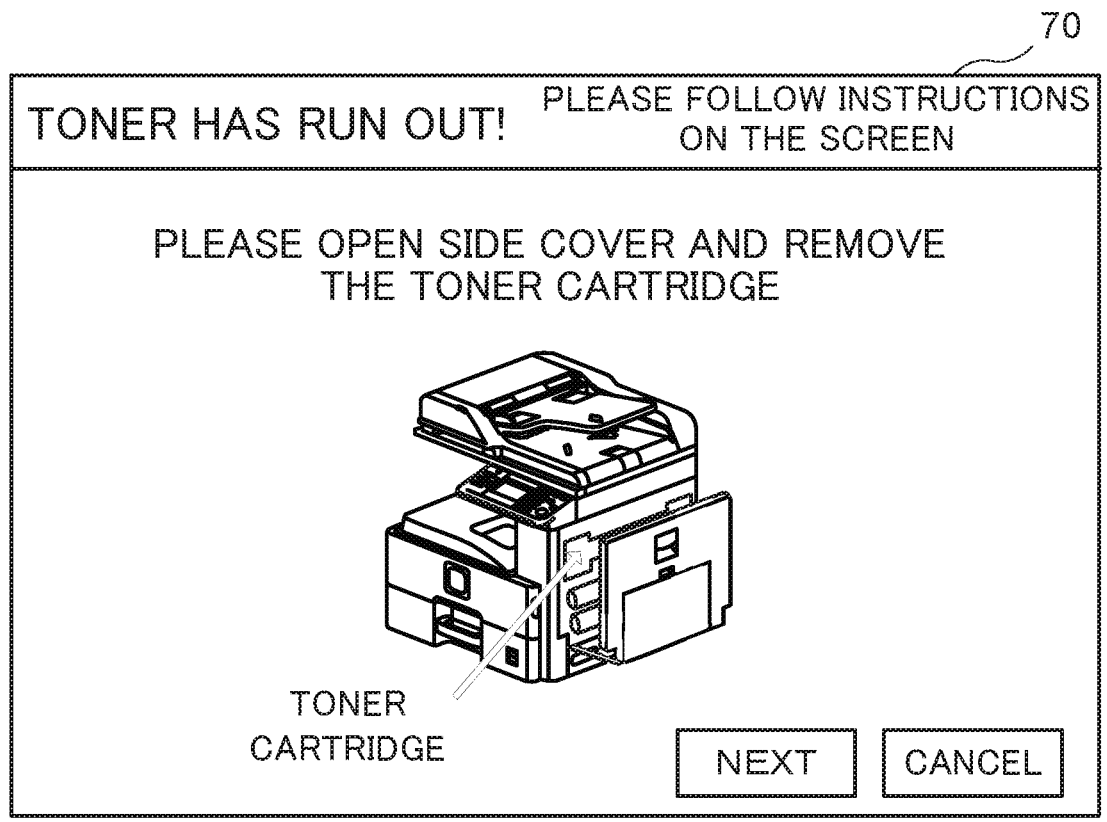
FIG. 7 is a diagram showing an example of the display screen displaying a pseudo error display displayed on the display.

When all the detection levels of the face detection performed by the determination section 103 are the predetermined threshold value or lower (YES in step S4), the controller 101 in the second embodiment allows the display 70 to display a screen pseudo-displaying that an error has occurred in the image forming apparatus 1 (step S15). In other words, though no error is occurring in the image forming apparatus 1, the screen indicating that an error is occurring is displayed on the display 70. As an example is shown in FIG. 7, a message indicating the occurrence of the out-of-toner error and messages prompting the user to open the side cover 201 provided at the main body 2 and to remove the toner container from the inside of the main body 2 (as the operation for eliminating the out-of-toner error) are displayed on the display screen.

The user who sees such the display screen will try to perform the operation of opening the side cover 201 provided at the main body 2 and the operation of removing the toner container from the main body 2. This increases the probability that the face of the user is imaged by the plurality of second cameras 200 installed around the image forming apparatus 1. Alternatively, another first camera 901 (see FIG. 1) may be further installed in the vicinity of the upper portion of the side cover 201. In this case, when the user performs the operation of opening the side cover 201, the user's face can be more reliably imaged by the first camera 901.

The configurations and processing described in the above embodiments with reference to FIGS. 1 to 7 are merely illustrative of the present disclosure and are not intended to limit the present disclosure to the above-described configurations and processing. For example, in the above embodiments, the image forming apparatus was referred to as one example of the electronic device in the scope of claims, but the electronic device may be other than the image forming apparatus: it may be a medical equipment, a machine tools, and the like, any electric devices other than the image forming apparatus.

While the present disclosure has been described in detail with reference to the embodiments thereof, it would be apparent to those skilled in the art the various changes and modifications may be made therein within the scope defined by the appended claims.

What is claimed is:
1. An electronic device comprising:
a display;
a first camera that images a face of a user who is operating the electronic device;
a storage unit that stores a first moving image imaged by the first camera;
a communication unit that is connected to a second camera via a network, the second camera being arranged at a periphery of a main body of the electronic device and imaging the main body; and
a control unit that includes a processor and, upon execution of a control program by the processor, functions as:

a detection section detecting that a suspicious operation is being performed on the electronic device; and a controller acquiring, when the detection section detects the suspicious operation, via the communication unit a second moving image imaged by the second camera and causing the display to display the acquired second moving image and the first moving image that the first camera is imaging at the same time, as moving images to be displayed in occurrence of the suspicious operation.

2. The electronic device according to claim 1, further comprising the communication unit that transmits and receives data with an information processing device connected via a network, wherein the controller causes the display to display the first moving image that the first camera is imaging, extracts, from first moving images stored in the storage unit, the first moving image imaged in a certain period before and after a time when the suspicious operation has been performed, and causes the communication unit to transmit the first moving image of the certain period to the information processing device.

3. The electronic device according to claim 1, wherein the control unit further functions as a determination section, the determination section obtaining the first moving image imaged by the first camera and the second moving image imaged by the second camera, detecting the face of the user shown in each of the obtained first and second moving images, and determining a detection level that indicates accuracy of face detection, the controller causes the display to display the first moving image or the second moving image that includes the face detected by the determination section and whose determined detection level is a highest.

4. The electronic device according to claim 3, wherein when the detection level of each of the first moving image obtained by the first camera and the second moving image obtained by the second camera is a predetermined threshold value or lower, the controller changes a display of the display to a predetermined display mode that differs from a regular state.

5. The electronic device according to claim 3, wherein when the detection level of each of the first moving image obtained by the first camera and the second moving image obtained by the second camera is a predetermined threshold value or lower, the controller causes the display to perform displaying that indicates an occurrence of a predetermined error requiring an error-coping work to be performed at a position at which the second camera can perform the imaging.

6. The electronic device according to claim 3, further comprising a speaker installed in a vicinity of an installation position of the first camera, wherein when the detection level of each of the first moving image obtained by the first camera and the second moving image obtained by the second camera is a predetermined threshold value or lower, the controller causes the speaker to output a warning tone.

7. The electronic device according to claim 1, wherein the storage unit stores in advance a security moving image showing a state where an administrator is coming toward the electronic device, and the controller causes the display to display, together with the moving images to be displayed in occurrence of the suspicious operation, or in place of that moving images, the security moving image stored in the storage unit.

8. The electronic device according to claim 1, wherein the electronic device is an image forming apparatus comprising an image forming unit that forms an image on a recording medium.

9. The electronic device according to claim 1, further comprising a sensor that detects an error occurs in the electronic device, wherein in detecting that a predetermined operation necessary for eliminating the error is being performed under a state where no errors are being detected based on a signal transmitted from the sensor, the detection section detects that the suspicious operation is performed.

10. The electronic device according to claim 1, wherein the controller obtains a plurality of second moving images imaged by the second camera, and causes the display to divide a display screen thereof and to display the obtained plurality of second moving images on the divided screen.

* * * * *